United States Patent [19]

Baillargeon et al.

[11] Patent Number: 5,002,588

[45] Date of Patent: Mar. 26, 1991

[54] MULTIFUNCTIONAL FUEL ADDITIVES

[75] Inventors: David J. Baillargeon, West Windsor Township, Mercer County; Angeline B. Cardis, Florence; Dale B. Heck, West Deptford, all of N.J.

[73] Assignee: Mobil Oil Corporation, Fairfax, Va.

[21] Appl. No.: 451,904

[22] Filed: Dec. 18, 1989

[51] Int. Cl.$^5$ ............................................. C10L 1/14
[52] U.S. Cl. ............................... 44/391; 44/331; 44/386; 525/437; 564/144; 564/169; 564/134
[58] Field of Search .................. 44/62, 70, 71, 75, 78, 44/63; 525/437; 564/144, 169, 134

[56] References Cited

U.S. PATENT DOCUMENTS

| | | | |
|---|---|---|---|
| 2,594,145 | 4/1952 | Flory | 525/420 |
| 3,397,255 | 8/1968 | Coats et al. | 525/437 |
| 3,882,085 | 5/1975 | Schmitt et al. | 525/420 |
| 4,061,621 | 12/1977 | Lofquist | 525/420 |
| 4,236,898 | 12/1980 | Davis et al. | 44/72 |
| 4,290,778 | 9/1981 | Herbstman et al. | 44/71 |
| 4,328,142 | 5/1982 | Hertel et al. | 525/420 |
| 4,402,708 | 9/1983 | Oswald | 44/62 |
| 4,404,001 | 9/1983 | Kaufman | 44/71 |
| 4,430,093 | 2/1984 | Jenkins, Jr. | 44/70 |
| 4,659,337 | 4/1987 | Sung | 44/71 |
| 4,690,980 | 9/1987 | Singer et al. | 525/286 |
| 4,732,948 | 3/1988 | McCready et al. | 525/437 |
| 4,744,798 | 5/1988 | Andress | 44/63 |

*Primary Examiner*—Margaret B. Medley
*Attorney, Agent, or Firm*—Alexander J. McKillop; Charles J. Speciale; Howard M. Flournoy

[57] ABSTRACT

Additive reaction products of (1) hydrocarbyl diols, and (2) the product of benzophenone tetracarboxylic dianhydride and hydrocarbyl aminoalcohols and/or amines improve the low-temperature properties of distillate fuels when added thereto.

29 Claims, No Drawings

MULTIFUNCTIONAL FUEL ADDITIVES

BACKGROUND OF THE INVENTION

This invention is directed to additives which improve the low-temperature properties of distillate fuels and to fuel compositions containing minor amounts of same.

Traditionally, the low-temperature properties of distillate fuels have been improved by the addition of kerosene, sometimes in very large amounts (5-70 wt %). The kerosene dilutes the wax in the fuel, i.e. lowers the overall weight fraction of wax, and thereby lowers the cloud point, filterability temperature, and pour point simultaneously. The additives of this invention effectively lower both the cloud point and CFPP of distillate fuel without any appreciable dilution of the wax component of the fuel.

Other additives known in the art have been used in lieu of kerosene to improve the low-temperature properties of distillate fuels. Many such additives are polymeric materials with pendent fatty hydrocarbon groups, and are usually derived from the free radical polymerization of unsaturated hydrocarbons (olefins, acrylates, fumarates, etc.). These additives are limited in their range of activity, however; most improve fuel properties by lowering the pour point and/or filterability temperature. These same additives have little or no effect on the cloud point of the fuel.

The additives of this invention are substantially different, however, both in terms of structure and function. They are oligomeric and/or polymeric materials obtained via condensation reactions, e.g. the reaction of diols with acids and/or anhydrides. In terms of activity, these additives effectively lower distillate fuel cloud point, thus providing improved low-temperature fuel properties, and offering a unique and useful advantage over known distillate fuel additives.

The novel oligomeric/polymeric benzophenone tetracarboxylate esters and ester/amides of this invention have been found to be surprisingly active wax crystal modifier additives for distillate fuels. Distillate fuel compositions containing less than 0.1 wt % of such additives demonstrate significantly improved low-temperature flow properties, with lower cloud point and lower CFPP filterability temperature.

SUMMARY OF THE INVENTION

This invention is more particularly directed to additives which improve the low-temperature properties of distillate fuels and which are the reaction products of (1) diols, and (2) the product of benzophenone tetracarboxylic dianhydride and aminoalcohols and/or amines with long-chain hydrocarbyl groups attached.

These new additives are especially effective in lowering the cloud point of distillate fuels, and thus improve the low-temperature flow properties of such fuels without the use of any light hydrocarbon diluent, such as kerosene. In addition, the filterability properties are improved as demonstrated by lower CFPP temperatures. Thus, the additives of this invention demonstrate multifunctional activity in distillate fuels.

This invention is also directed to fuel compositions comprising minor amounts of these multifunctional additives derived from diols, BTDA and aminoalcohols and/or amines.

The additive compositions, described in this application, have cloud point activity, and CFPP activity and are unique in structure and activity. Additive concentrates and fuel compositions containing such additives are also unique. Similarly, the processes for making these additives, additive concentrates, and fuel compositions are unique. Accordingly, it is not believed that these novel additive products and fuel compositions thereof were heretofore known or used in the prior art.

DESCRIPTION OF THE SPECIFIC EMBODIMENTS

These oligomeric/polymeric additives are the reaction products derived from two types of monomer components. The first monomer type is a diol, either alone or in combination with other diols. The second monomer type is the reactive acid/anhydride product, either alone or in combination with other such monomers, derived from the reaction of benzophenone tetracarboxylic dianhydride (BTDA) with either (a) an aminoalcohol, the product of an amine and an epoxide, or (b) a combination of an aminoalcohol (above, a) and an amine.

The additives of this invention accordingly, have oligomeric (i.e. dimers, trimers, etc.) and/or polymeric structures. Various hydrocarbyl groups, especially groups with linear paraffinic substructures attached, are distributed along the backbone of the oligomer and/or polymer, and may be carried by either or both of the comonomers used.

Any diol may be used in this invention. Such diols may encompass, but are not limited to examples of the following types: 1,2-diols, 1,3-diols, 1,4-diols, alpha-omega-diols, ether diols, polyether diols, glyceryl monoesters, and any other hydrocarbyl diol. However, 1,12-dodecanediol and poly(propyleneglycol) are among the preferred reactants.

The other comonomer, alone or in combination, used in the synthesis of these additives is a reactive acid and/or anhydride derived from the reaction of benzophenone tetracarboxylic dianhydride (BTDA) or its acid equivalent, and suitable pendant groups derived from alcohols and amines with some combination of linear hydrocarbyl groups attached. Any suitable amine may be used. The amine may be primary, secondary, aliphatic, or aromatic, arylalkyl or alkylaryl having from 1 to about 100 carbon atoms. A highly suitable amine is di(hydrogenated tallow)amine. Any suitable aminoalcohol may be used; such aminoalcohols may be derived from a secondary amine capped with an olefin epoxide.

The pendant groups include (a) aminoalcohols, (b) combinations of the aminoalcohol from (a) and an amine, and (c) combinations of two or more different aminoalcohols.

The additives of this invention are the reaction products obtained by combining the two monomer types described above in differing ratios using standard esterification techniques according to the following stepwise procedure:

$$\text{BTDA} + \text{HO}-\underset{\underset{R_3}{|}}{\text{CH}}-\text{CH}_2-\underset{\underset{R_2}{|}}{\text{N}}-R_1 + \quad (1)$$

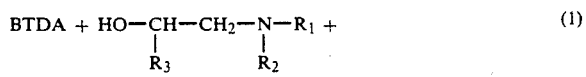

Reactive Acid/Anhydride + HO—R$_5$—OH → Oligomer/Polymer  (2)

For example, a general structure for the oligomers/polymers derived from [BTDA partial ester] and [diol] is as follows:

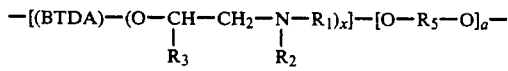

A general structure for the oligomers/polymers derived from [BTDA mixed partial ester] and [diol] is as follows:

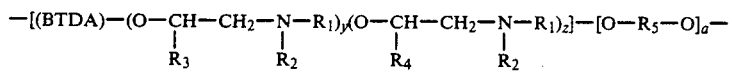

A general structure for the oligomers/polymers derived from [BTDA partial ester/amide] and [diol] is as follows:

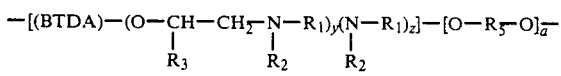

Where:
x = y + z = 0.5 to 3.5, preferably from 1 to about 3
a = 0.25 to 2, preferably from 0.5 to about 1.25
$R_1$, $R_3$ = $C_8$-$C_{50}$ linear hydrocarbyl groups, either saturated or unsaturated.
$R_2$ = $R_1$, $C_1$-$C_{100}$ hydrocarbyl
$R_4$ = H, $C_1$-$C_{100}$ hydrocarbyl
$R_5$ = $C_2$-$C_{100}$ hydrocarbyl Included within the scope of the epoxides used in preparing aminoalcohols from amines as set forth above, are 1,2-epoxides, including, for example, 1,2-epoxydecane, 1,2-epoxydodecane, 1,2-epoxytetradecane, 1,2-epoxypentadecane, 1,2-epoxyhexadecane, 1,2-epoxyheptadecane, 1,2-epoxyoctadecane, 1,2-epoxyeicosane and mixtures thereof. Especially preferred is 1,2-epoxyoctadecane.

In general the additive reaction product can be synthesized under widely varying conditions which are not believed to be critical. The reaction temperature can vary from 100° to 250° C., preferably from 150° to 190° C., under ambient or autogenous pressure. However, slightly higher pressures may be used if desired. The temperature chosen will depend for the most part on the particular reactants and on whether or not a solvent is used. Solvents when used will typically be hydrocarbon solvents such as xylene, but any non-polar, unreactive solvent can be used including benzene and toluene and/or mixtures thereof.

Molar ratios, less than molar ratios or more than molar ratios of the reactants can be used. Preferentially, a molar ratio of diol to reactive acid/anhydride of 1:2 to 3.5:1 is used.

The times for the reactions are also not believed to be critical. The process is generally carried out in about 1 to about 24 hours or more.

In general, the reaction products of the present invention may be employed in any amount effective for imparting the desired degree of activity to improve the low temperature characteristics of distillate fuels. In many applications the products are effectively employed in amounts from about 0.001% to about 10% by weight and preferably from less than about 0.1% to about 5% of the weight of the total composition. These additives may be used in conjunction with other known low-temperature fuel additives (dispersants, etc.) being used for their intended purpose.

The fuels contemplated are liquid hydrocarbon combustion fuels, including the distillate fuels and fuel oils. Accordingly, the fuel oils that may be improved in accordance with the present invention are hydrocarbon fractions having an initial boiling point of at least about 250° F. and an end-boiling point no higher than about 750° F. and boiling substantially continuously throughout their distillation range. Such fuel oils are generally known as distillate fuel oils. It is to be understood, however, that this term is not restricted to straight run distillate fractions. The distillate fuel oils can be straight run distillate fuel oils, catalytically or thermally cracked (including hydrocracked) distillate fuel oils, or mixtures of straight run distillate fuel oils, naphthas and the like, with cracked distillate stocks. Moreover, such fuel oils can be treated in accordance with well-known commercial methods, such as, acid or caustic treatment, hydrogenation, solvent refining, clay treatment, etc.

The distillate fuel oils are characterized by their relatively low viscosities, pour points, and the like. The principal property which characterizes the contemplated hydrocarbons, however, is the distillation range. As mentioned hereinbefore, this range will generally lie between about 250° F. and about 750° F. Obviously, the distillation range of each individual fuel oil will cover a narrower boiling range falling, nevertheless, within the above-specified limits. Likewise, each fuel oil will boil substantially continuously throughout its distillation range.

Contemplated among the fuel oils are Nos. 1, 2 and 3 fuel oils used in heating and as diesel fuel oils, and the jet combustion fuels. The domestic fuel oils generally conform to the specification set forth in A.S.T.M. Specifications D396-48T. Specifications for diesel fuels are defined in A.S.T.M. Specification D975-48T, Typical jet fuels are defined in Military Specification MIL-F-5624B.

The following examples are illustrative only and are not meant to limit the scope of the invention.

EXAMPLE 1

Preparation of Additive 1

Di(hydrogenated tallow) amine (50.0 grams, 0.10 mol; from Akzo Chemie), and 1,2-epoxyoctadecane (33.6 grams, 0.125 mol; e.g. Vikolox 18 from Viking Chemical) were combined and heated at 170° for 16-18 hours. Benzophenone tetracarboxylic dianhydride (17.7 grams, 0.055 mol; e.g. BTDA from Allco Chemical Corporation), 1,12 dodecanediol (5.06 grams, 0.025 mol; e.g. from Aldrich Chemical Company), and xylene (approximately 50 ml) were added and heated at reflux (190°–200° C.) with azeotropic removal of water for 24 hours. Volatiles were then removed from the reaction medium at 190°–200° C., and the reaction mixture was hot filtered through diatomaceous earth to give 92.5 grams of the final product.

EXAMPLE 2

Preparation of Additive 2

According to the procedure used for Example 1 (above), di(hydrogenated tallow) amine (50.0 grams, 0.10 mol), and 1,2-epoxyoctadecane (33.6 grams, 0.125 mol) were combined. Then, benzophenone tetracarboxylic dianhydride (17.7 grams 0.055 mol), 1,12 dodecanediol (9.11 grams, 0.045 mol), and xylene (approximately 50 ml) were added and allowed to react. Excess xylene was added to facilitate filtration, and was subsequently removed by evaporative distillation. After isolation, 102.0 grams of the final product was obtained.

EXAMPLE 3

Preparation of Additive 3

According to the procedure used for Example 1 (above), di(hydrogenated tallow) amine (50.0 grams, 0.10 mol), and 1,2-epoxyoctadecane (33.6 grams, 0.125 mol) were combined. Then, benzophenone tetracarboxylic dianhydride (17.7 grams 0.055 mol), poly(propyleneglycol) with avg. M.W. 400 (10.0 grams, 0.025 mol; from Texaco Chemical Company), and xylene (approximately 50 ml) were added and allowed to react. After isolation, 97.8 grams of the final product was obtained.

EXAMPLE 4

Preparation of Additive 4

According to the procedure used for Example 1 (above), di(hydrogenated tallow) amine (50.0 grams, 0.10 mol), and 1,2-epoxyoctadecane (33.6 grams, 0.125 mol) were combined. Then, benzophenone tetracarboxylic dianhydride (17.7 grams 0.055 mol), poly(propyleneglycol) with avg. M.W. 400 (21.0 grams, 0.052 mol), and xylene (approximately 50 ml) were added and allowed to react. After isolation, 111.2 grams of the final product was obtained.

EXAMPLE 5

Preparation of Additive 5

According to the procedure used for Example 1 (above), di(hydrogenated tallow) amine (40.0 grams, 0.08 mol), and 1,2-epoxyoctadecane (26.8 grams, 0.10 mol) were combined. Then, benzophenone tetracarboxylic dianhydride (14.2 grams 0.044 mol), poly(propyleneglycol) with avg. M.W. 2000 (40.0 grams, 0.020 mol; from Texaco Chemical Company), and xylene (approximately 50 ml) were added and allowed to react. After isolation, 109.7 grams of the final product was obtained.

EXAMPLE 6

Preparation of Additive 6

According to the procedure used for Example 1 (above), di(hydrogenated tallow) amine (35.0 grams, 0.07 mol), and 1,2-epoxyoctadecane (23.5 grams, 0.088 mol) were combined. Then, benzophenone tetracarboxylic dianhydride (12.4 grams 0.038 mol), poly(propyleneglycol) with avg. M.W. 2000 (73.5 grams, 0.037 mol; and xylene (approximately 50 ml) were added and allowed to react. After isolation, 131.4 grams of the final product was obtained.

EXAMPLE 7

Preparation of Additive 7

According to the procedure used for Example 1 (above), di(hydrogenated tallow) amine (51.0 grams, 0.10 mol), and 1,2-epoxyoctadecane (14.2 grams, 0.050 mol) were combined. Then, benzophenone tetracarboxylic dianhydride (16.1 grams 0.050 mol), poly(propyleneglycol) with avg. M.W. 400 (20.0 grams, 0.050 mol; and xylene (approximately 50 ml) were added and allowed to react. After isolation, 90.7 grams of the final product was obtained.

Preparation of Additive Concentrate

A concentrate solution of 100 ml total volume was prepared by dissolving 10 grams of additive in mixed xylenes solvent. Any insoluble particulates in the additive concentrate were removed by filtration before use.

Test Procedures

The cloud point of the additized distillate fuel was determined using an automatic cloud point test based on the commercially available Herzog cloud point tester; the test designation (below) is "HERZOG."

The low-temperature filterability was determined using the Cold Filter Plugging Point (CFPP) test. This test procedure is described in "Journal of the Institute of Petroleum," Volume 52, Number 510, June 1966, pp. 173–185.

Test Fuel Characteristics

|  | FUEL A | FUEL B |
| --- | --- | --- |
| API Gravity | 35.5 | 34.1 |
| Cloud Point, °F. Herzog | 16.4 | 23.4 |
| CFPP, °F. | 9 | 16 |
| Pour Point, °F. | 10 | 0 |

TABLE

Additive Effects on the Cloud Point and Filterability (CFPP) of Distillate Fuel (Additive Concentration = 0.1 Wt %)

| | IMPROVEMENT IN PERFORMANCE TEMPERATURE (°F.) | | | |
| --- | --- | --- | --- | --- |
| | DIESEL FUEL A CLOUD POINT | | DIESEL FUEL B CLOUD POINT | |
| ADDITIVE | HERZOG | CFPP | HERZOG | CFPP |
| 1 | 2.4 | 4 | 7.7 | 4 |
| 2 | 1.8 | 6 | 6.7 | 4 |
| 3 | 3.3 | 6 | 6.7 | 2 |
| 4 | 2.7 | 6 | 6.1 | 4 |
| 5 | 3.6 | 4 | 7 | 6 |
| 6 | 3.4 | 6 | 5.8 | 4 |
| 7 | 2.1 | — | 4.3 | 7 |

The test data clearly illustrate the improved low-temperature characteristics of distillate fuels which incorporate minor amounts of the novel additive products of this invention.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

What is claimed is:

1. A product of reaction obtained from the reaction of (1) a hydrocarbyl diol and (2) the product of benzophenone tetracarboxylic dianhydride and a hydrocarbyl aminoalcohol or mixtures thereof via the following generalized procedures:

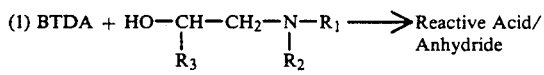

(2) Reactive Acid/Anhydride + HO—$R_5$OH—Oligomer/Polymer
wherein:
$R_1$ and $R_3$ are $C_8$ to about $C_{50}$ linear hydrocarbyl groups, $R_2$ is $C_1$ to about $C_{100}$ hydrocarbyl, and $R_5$ is $C_2$ to about $C_{100}$ hydrocarbyl and wherein said reaction is carried out at temperatures varying from ambient or about 100° to about 250° C. or reflux, in less than molar, more than molar or substantially molar amounts of reactants under ambient or slightly higher pressures.

2. The product of claim 1 wherein said oligomer/polymer comprises at least one structure derived from BTDA partial ester and diol generally described as follows:

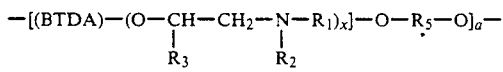

wherein: a is 0.25 to about 2 and x is 0.5 to about 3.5.

3. The product of claim 1 wherein said oligomer/polymer comprises at least one structure from BTDA mixed partial ester and diol generally described as follows:

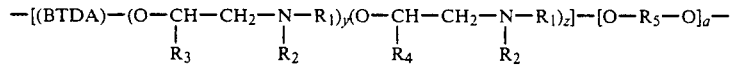

wherein $R_4$ is hydrogen or $C_1$ to about $C_{100}$ hydrocarbyl, $R_5$ is $C_2$ to about $C_{100}$, y is greater than 0, and z is greater than 0, and y+z is 0.5 to 3.5.

4. The product of claim 1 wherein said oligomer/polymer at least one structure derived from BTDA partial ester/amide and diol generally described as follows:

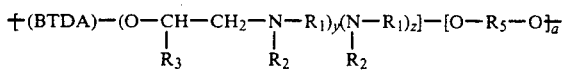

wherein a is about 0.25 to 2, and y is greater than 0, z is greater than 0, and y+z is 0.5 to about 3.5.

5. The product of claim 1 wherein the diol is 1,12-dodecanediol.

6. The product of claim 1 wherein the diol is poly(propyleneglycol).

7. The product of claim 1 wherein the hydrocarbyl amine is di(hydrogenated tallow) amine.

8. The product of claim 7 wherein said amine is coupled with 1,2-epoxyoctadecane.

9. A composition comprising a major amount of a liquid hydrocarbyl fuel and a minor low-temperature flow properties improving amount of an additive product of the reaction of (1) a suitable diol and (2) and product of a benzophenone tetracarboxylic dianhydride and a long-chain hydrocarbyl aminoalcohol prepared in the following generalized manner:

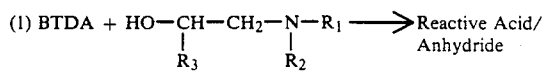

(2) Reactive Acid/Anhydride + HO—$R_5$OH—Oligomer/Polymer
Wherein:
$R_1$ and $R_3$ are $C_8$ to about $C_{50}$ linear hydrocarbyl groups, $R_2$ is $C_1$ to about $C_{100}$ hydrocarbyl, and $R_5$ is $C_2$ to about $C_{100}$ hydrocarbyl and wherein said reaction is carried out at temperatures varying from ambient or about 100° to about 250° C. or reflux, in less than molar, more than molar, or substantially molar amounts of reactants under ambient or slightly higher pressures.

10. The composition of claim 9 wherein said oligomer/polymer comprises at least one structure derived from BTDA partial ester and diol generally described as follows:

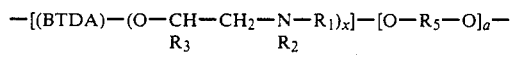

wherein a is 0.25 to 2 and x is 0.5 to 3.5.

11. The composition of claim 9 wherein said oligomer/polymer comprises at least one structure derived from BTDA mixed partial ester and diol generally described as follows:

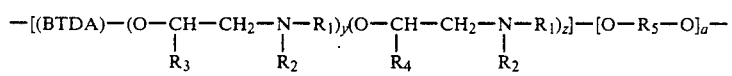

wherein $R_4$ is hydrogen or $C_1$ to about $C_{100}$ hydrocarbyl, y is greater than 0, and z is greater than 0, and y+z is 0.5 to 3.5.

12. The composition of claim 9 wherein said oligomer/polymer comprises at least one structure derived from BTDA partial ester/amide and diol generally described as follows:

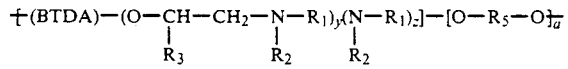

wherein a is 0.25 to 2, y is greater than 0, z is greater than 0, and y+z is about 0.5 to 3.5.

13. The composition of claim 9 wherein the diol is 1,12-dodecanediol.

14. The composition of claim 9 wherein said diol is poly(propyleneglycol).

15. The composition of claim 9 wherein the hydrocarbyl amine is di(hydrogenated tallow) amine.

16. The composition of claim 15 wherein said amine is coupled with 1,2-epoxyoctadecane.

17. The composition of claim 9 wherein said liquid hydrocarbyl is selected from distillate fuels and fuel oils.

18. The composition of claim 9 wherein said fuel is a distillate fuel oil.

19. The composition of claim 17 wherein said fuel oil is selected from fuel oils Nos. 1, 2 or 3.

20. The composition of claim 19 wherein said fuel oil is a heating fuel oil.

21. The composition of claim 19 wherein said fuel oil is a jet combustion fuel.

22. The composition of claim 19 wherein said fuel oil is a diesel fuel oil.

23. The composition of claim 9 comprising from about 0.001% to about 10% by weight of the total composition of the additive product.

24. The composition of claim 23 comprising from about 0.1% to about 65% by weight of the additive product.

25. A process of preparing a product of reaction suitable for use as a low-temperature flow properties improver additive for liquid hydrocarbyl fuel comprising the following generalized reaction:

(1) BTDA + HO—CH—CH$_2$—N—R$_1$ +
                |         |
                R$_3$      R$_2$ optionally H—H—R$_1$ $\longrightarrow$ Reactive Acid/Anhydride
              |
              R$_2$ (2) Reactive Acid/Anhydride + HO—R$_5$OH—Oligomer/Polymer comprising, the following generalized structures:

(A) a general structure derived from BTDA partial ester and diol as follows:

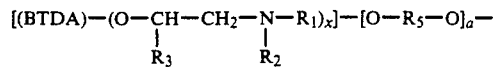

(B) a general structure derived from BTDA mixed partial ester and diol as follows:

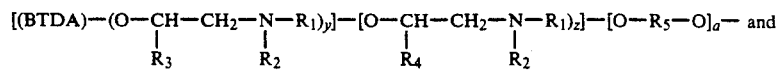 and (C) a general structure derived from and as follows:

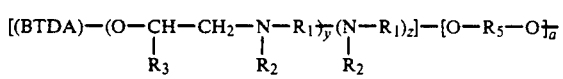

+ other possible structures wherein: R$_1$ and R$_3$ are C$_8$ to about C$_{50}$ hydrocarbyl groups,
R$_2$ is C$_1$ to about C$_{100}$ hydrocarbyl,
R$_4$ is H, C$_1$ to about C$_{100}$ hydrocarbyl, and
R$_5$ is C$_2$ to about C$_{100}$ hydrocarbyl groups,
x = y + z = about 0.5 to about 3.5
a = about 0.25 to about 2 and wherein the reactants are reacted in molar ratios, less than molar ratios or more than molar ratios at temperatures varying from ambient or about 100° to about 250° C., pressures varying from atmospheric or slightly higher for a time sufficient to obtain the desired oligomer/polymer additive product.

26. A method of improving the flow characteristics of liquid hydrocarbon fuels comprising adding thereto a minor amount of from about 0.001% to about 10% by weight of the composition of a low-temperature additive product as described in claim 1.

27. The method of claim 26 comprising adding to said fuel about 0.001% to about 10% by weight of the composition of the low-temperature additive product.

28. The concentrate of claim 27 wherein said solvent is xylene or mixture of xylenes.

29. An additive concentrate comprising a total volume of about 100 ml of a hydrocarbon solvent having dissolved therein about 10 grams of an additive product as described in claim 1.

* * * * *